United States Patent
Adams et al.

(10) Patent No.: US 12,122,282 B2
(45) Date of Patent: Oct. 22, 2024

(54) RECREATIONAL VEHICLE WITH RECONFIGURABLE TABLE

(71) Applicant: REV Recreation Group, Inc., Decatur, IN (US)

(72) Inventors: Kasey Lee Adams, Decatur, IN (US); Mark Anthony Perez, Fort Wayne, IN (US)

(73) Assignee: REV Recreation Group, Inc., Decatur, IN (US)

( * ) Notice: Subject to any disclaimer, the term of this patent is extended or adjusted under 35 U.S.C. 154(b) by 0 days.

(21) Appl. No.: 18/467,919

(22) Filed: Sep. 15, 2023

(65) Prior Publication Data

US 2024/0001830 A1    Jan. 4, 2024

Related U.S. Application Data

(63) Continuation of application No. 17/544,169, filed on Dec. 7, 2021, now Pat. No. 11,760,248.

(Continued)

(51) Int. Cl.
*B60N 3/00*    (2006.01)
*B60P 3/36*    (2006.01)
*B60P 3/34*    (2006.01)

(52) U.S. Cl.
CPC ............... *B60N 3/001* (2013.01); *B60P 3/36* (2013.01); *B60P 3/34* (2013.01)

(58) Field of Classification Search
CPC ........... A47B 5/00; A47B 5/006; A47B 31/06; A47B 96/02; B60N 3/001; B60P 3/34; B60P 3/36

(Continued)

(56) References Cited

U.S. PATENT DOCUMENTS 719,625 A * 2/1903 Throm ................... A47B 21/02
                                                  16/349
2,797,739 A * 7/1957 Orsini ..................... B60N 2/793
                                                  297/188.17

(Continued)

FOREIGN PATENT DOCUMENTS

KR        20230019346 A        2/2023
KR        20240046813 A *      4/2024

*Primary Examiner* — Jason S Morrow
*Assistant Examiner* — Wenwei Zhuo
(74) *Attorney, Agent, or Firm* — Michael Best & Friedrich LLP (57) ABSTRACT

A recreational vehicle is disclosed comprising wheels adapted to roll along a ground surface, a chassis supported on the wheels, and a table assembly supported by the chassis and having a supporting surface adapted to support an object. The table assembly includes a stowed position in which the supporting surface defines a first plane and an extended position in which the supporting surface defines a second plane generally parallel to the first plane. The extended position is rotationally displaced from the stowed position. A center of gravity of the table member may be spaced from the wall by a first horizontal distance when in the stowed position and may be spaced from the wall by a second horizontal distance greater than the first horizontal distance when in the extended position. If desired, an upper stay member can be positioned above the table member to limit upward movement of the table member.

19 Claims, 7 Drawing Sheets

Related U.S. Application Data (60) Provisional application No. 63/122,266, filed on Dec. 7, 2020.

(58) Field of Classification Search
USPC .............. 108/44, 152, 42, 50.01; 296/24.33
See application file for complete search history.

(56) References Cited

U.S. PATENT DOCUMENTS

| | | | |
|---|---|---|---|
| 4,687,167 A * | 8/1987 | Skalka | A47B 21/0314 108/103 |
| 4,709,641 A | 12/1987 | Lenger | |
| 6,089,167 A * | 7/2000 | Frohardt | H05K 9/0067 108/142 |
| 6,925,944 B1 | 8/2005 | Miller et al. | |
| 7,399,031 B2 | 7/2008 | Gardner | |
| 7,997,211 B2 * | 8/2011 | Peterson | F16M 11/2014 108/50.01 |
| 8,887,644 B2 | 11/2014 | Edinger et al. | |
| 8,894,121 B2 | 11/2014 | Eilers et al. | |
| 9,371,029 B2 | 6/2016 | Hillman et al. | |
| 9,878,648 B2 | 1/2018 | Hillman et al. | |
| 10,639,971 B2 * | 5/2020 | Hoggarth | B60N 3/002 |
| 11,518,286 B2 | 12/2022 | Hwang et al. | |
| 2004/0256874 A1 * | 12/2004 | Rex | B60P 3/34 296/26.13 |
| 2005/0104489 A1 * | 5/2005 | Ortiz | A47B 17/03 312/282 |
| 2007/0102975 A1 | 5/2007 | Gardner | |
| 2009/0249982 A1 | 10/2009 | Palethorpe | |
| 2012/0199051 A1 * | 8/2012 | Edinger | A47B 11/00 74/82 |
| 2017/0080954 A1 | 3/2017 | Pailler et al. | |
| 2021/0300225 A1 * | 9/2021 | Hwang | B60N 2/12 |
| 2022/0095785 A1 * | 3/2022 | Satterfield | A47C 7/70 |
| 2022/0117389 A1 * | 4/2022 | O'Hara | A47B 5/006 |
| 2023/0227162 A1 * | 7/2023 | Satterfield | B64D 11/0605 108/44 |
| 2023/0234489 A1 * | 7/2023 | Mann | B60N 3/002 312/313 |

* cited by examiner

RECREATIONAL VEHICLE WITH RECONFIGURABLE TABLE

CROSS-REFERENCE TO RELATED APPLICATIONS

This application is a continuation of U.S. patent application Ser. No. 17/544,169, filed on Dec. 7, 2021, which issued as U.S. Pat. No. 11,760,248 on Sep. 19, 2023, which claims priority to U.S. Provisional Patent Application No. 63/122,266, filed on Dec. 7, 2020, the entire contents all of which are hereby incorporated by reference herein.

BACKGROUND

The present disclosure relates generally to the field of recreational vehicles and specifically to a table that can be reconfigured to multiple different orientations.

SUMMARY

Described herein is a recreational vehicle comprising wheels adapted to roll along a ground surface, a chassis supported on the wheels, and a table assembly supported by the chassis and having a supporting surface adapted to support an object. The table assembly includes a stowed position in which the supporting surface defines a first plane (e.g., a generally horizontal plane) and an extended position in which the supporting surface defines a second plane (e.g., a generally horizontal plane) generally parallel to (e.g., co-planar with) the first plane. The extended position is rotationally displaced from the stowed position.

In one embodiment, the recreational vehicle further comprises a wall supporting the table assembly, and the table assembly includes a table member having a first edge positioned adjacent the wall when in the stowed position. Preferably, a second edge (e.g., different than the first edge) of the table member is positioned adjacent the wall when in the extended position. A center of gravity of the table member may be spaced from the wall by a first horizontal distance when in the stowed position and may be spaced from the wall by a second horizontal distance greater than the first horizontal distance when in the extended position.

If desired, an upper stay member can be positioned above the table member to limit upward movement of the table member. The stay member may include an anti-scratch material (e.g., plastic) or a roller member positioned to provide rolling motion between the table member and the stay member.

The table assembly can further include a transfer mechanism coupled to the table member to facilitate movement of the table member between the stowed position and the extended position. The transfer mechanism preferably includes a telescoping slide mechanism and a rotation mechanism. For example, the rotation mechanism can be supported by the telescoping slide mechanism.

Other aspects of the disclosure will become apparent by consideration of the detailed description and accompanying drawings.

DETAILED DESCRIPTION

Before any embodiments are explained in detail, it is to be understood that the present disclosure is not limited in its application to the details of construction and the arrangement of components set forth in the following description or illustrated in the following drawings. The disclosure is capable of other embodiments and of being practiced or of being carried out in various ways.

Figure 1:
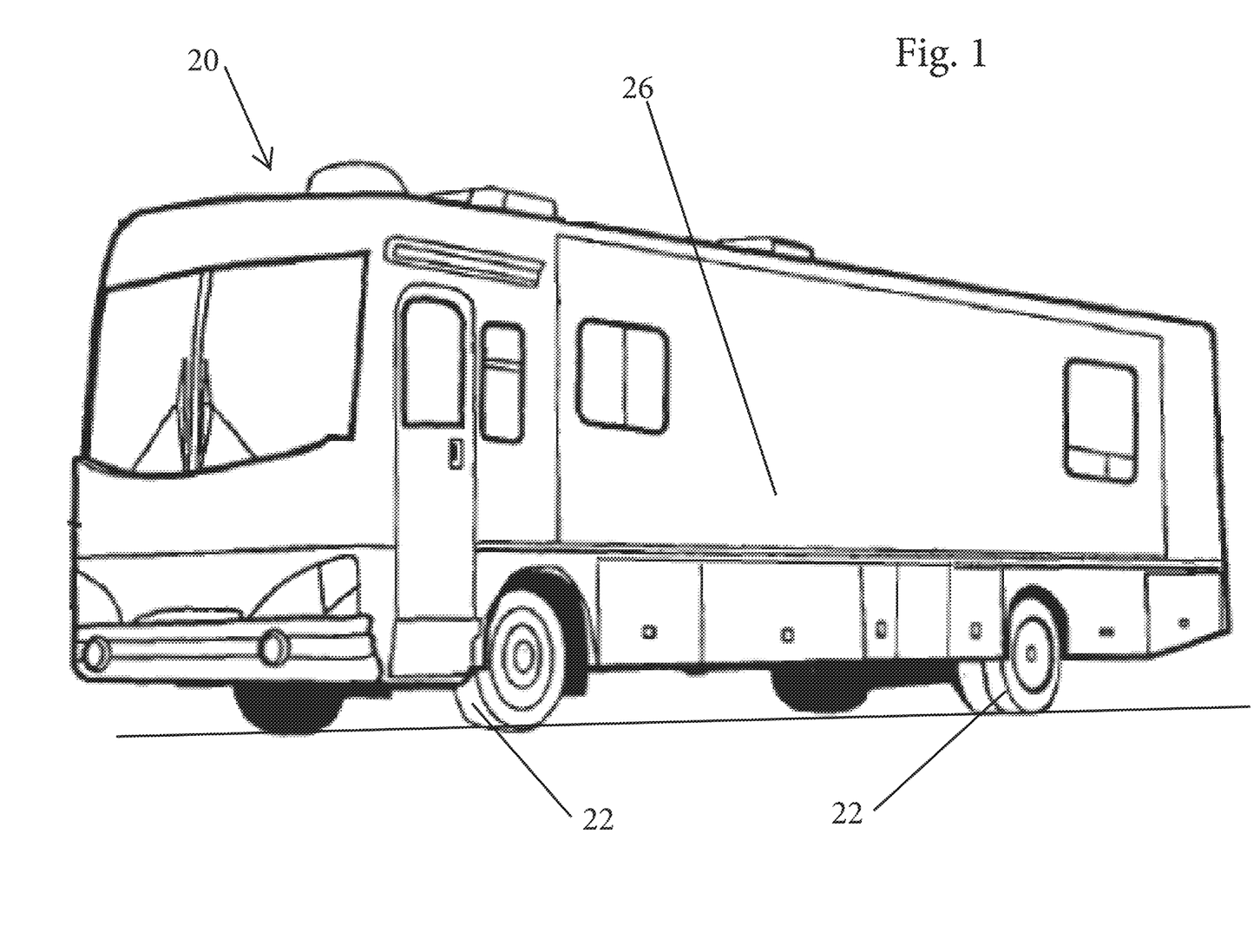
FIG. 1 is a view of a recreational vehicle.

FIG. 1 illustrates a recreational vehicle 20 comprising wheels 22 adapted to roll along a ground surface 24 and a chassis 26 supported on the wheels 22.

Figure 2:
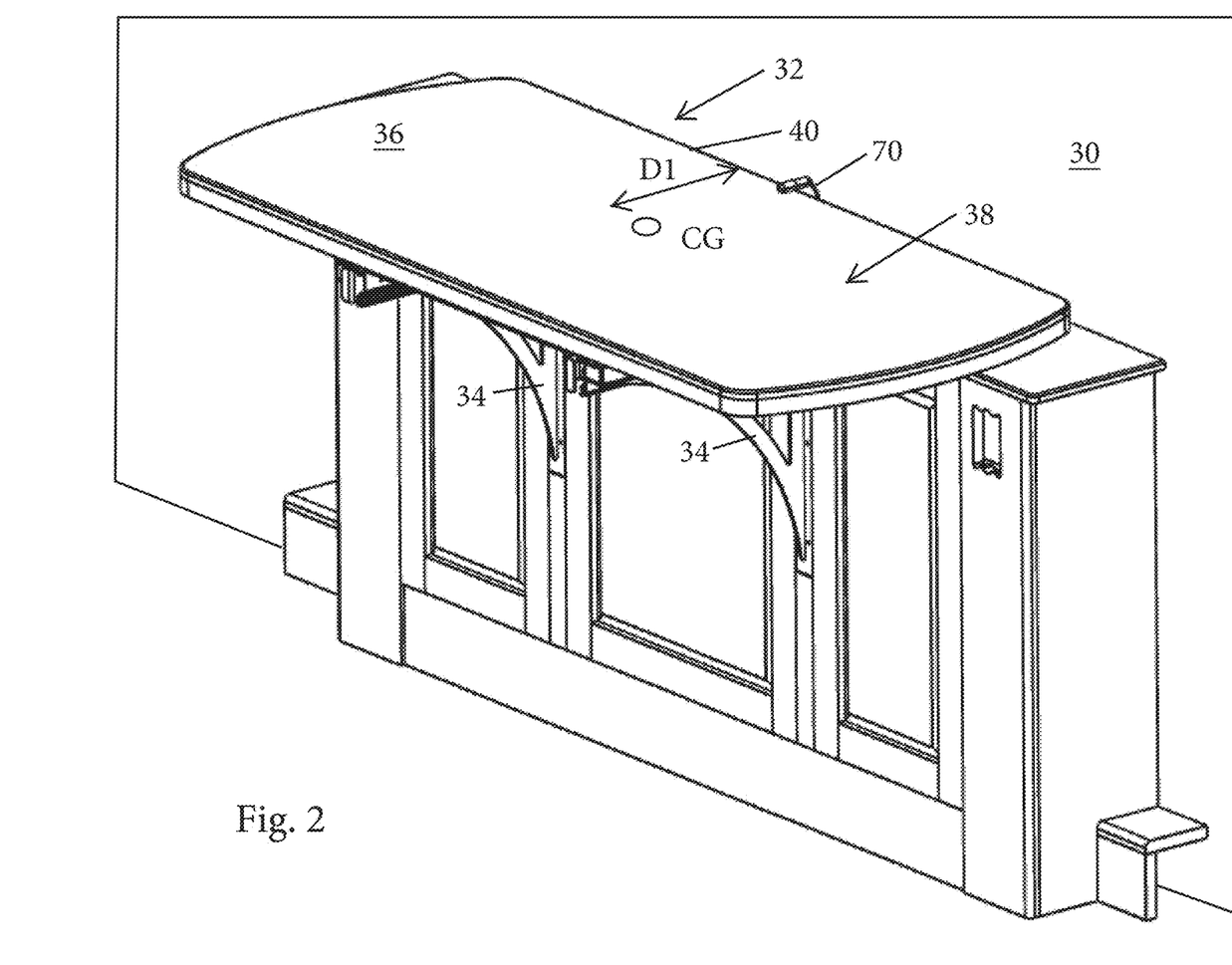
FIG. 2 is a perspective view of a table assembly in a stowed position.
Figure 3:
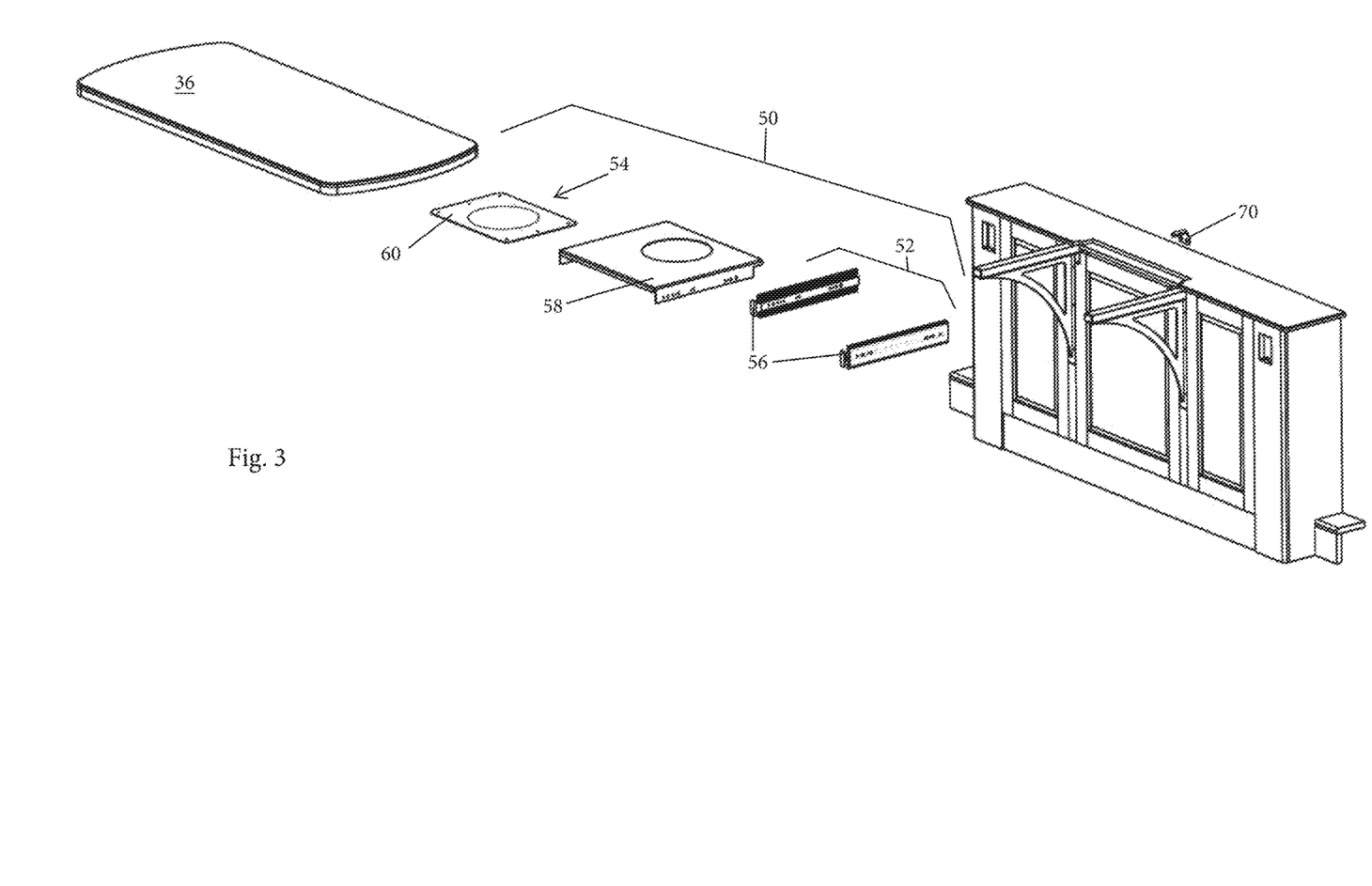
FIG. 3 is an exploded view of the table assembly of FIG. 2.

Referring to FIG. 2, the illustrated recreational vehicle 20 further includes a wall 30 supported by the chassis on the inside of the vehicle, a shelf 31, and a table assembly 32 supported by the shelf 31 and the wall 30. The wall 30 can be a fixed wall or movable wall that is sufficiently sturdy to support the table assembly 32.

The illustrated table assembly 32 includes two brackets 34 secured to the wall 30 and positioned to support a table member 36 having a supporting surface 38. The table member 36 can be moved from a stowed position (FIG. 2) to an extended position (FIG. 5) that is both rotated and translated from the stowed position. When in the stowed position, the position of the table member 36 is designed to meet walk-through clearance requirements, which is advantageous and/or required when the vehicle is moving. When in the extended position, the position of the table member 36 provides ample seating for at least four people when the vehicle is parked.

In the stowed position, a side edge 40 of the table member 36 is positioned adjacent the wall 30, a center of gravity CG of the table member 36 is positioned a first distance D1 from the wall 30, and the supporting surface 38 of the table member 36 defines a generally horizontal plane. In the extended position (FIG. 5), an end edge 42 of the table member 36 is positioned adjacent the wall 30, the center of gravity CG of the table member 36 is positioned at a second distance D2 (greater than the first distance D1) from the wall 30, and the supporting surface 38 defines a generally horizontal plane that is generally parallel to (e.g., co-planar with) the plane defined in the stowed position. As such, when the illustrated table member 36 is moved from the stowed position to the extended position, the center of gravity CG of the table member 36 is moved away from the wall 30, the upper surface 38 of the table member stays in the same plane, and the table member 36 is rotated (e.g., 90 degrees).

Figure 4:
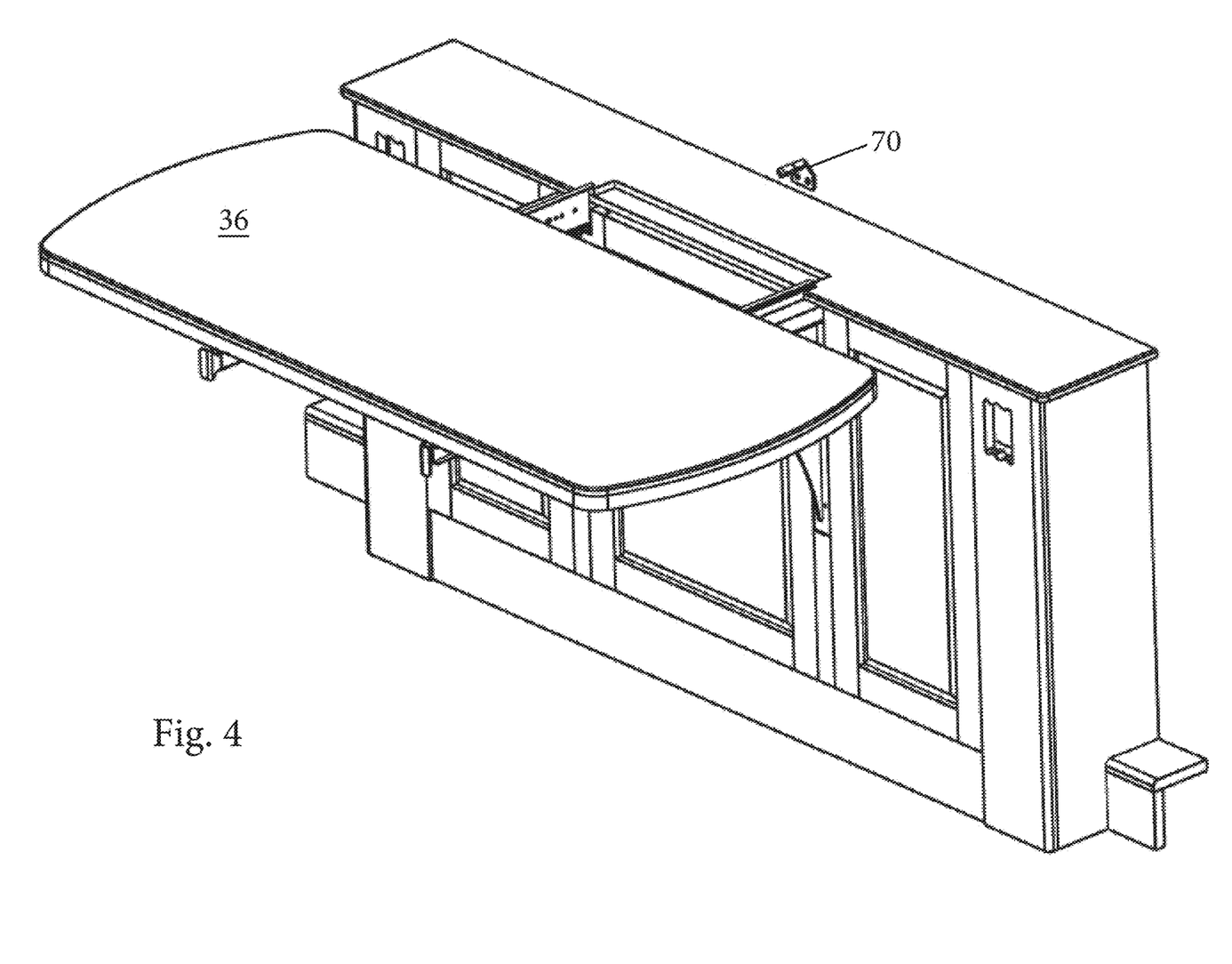
FIG. 4 is a perspective view of the table assembly of FIG. 1 in an intermediate position.
Figure 5:
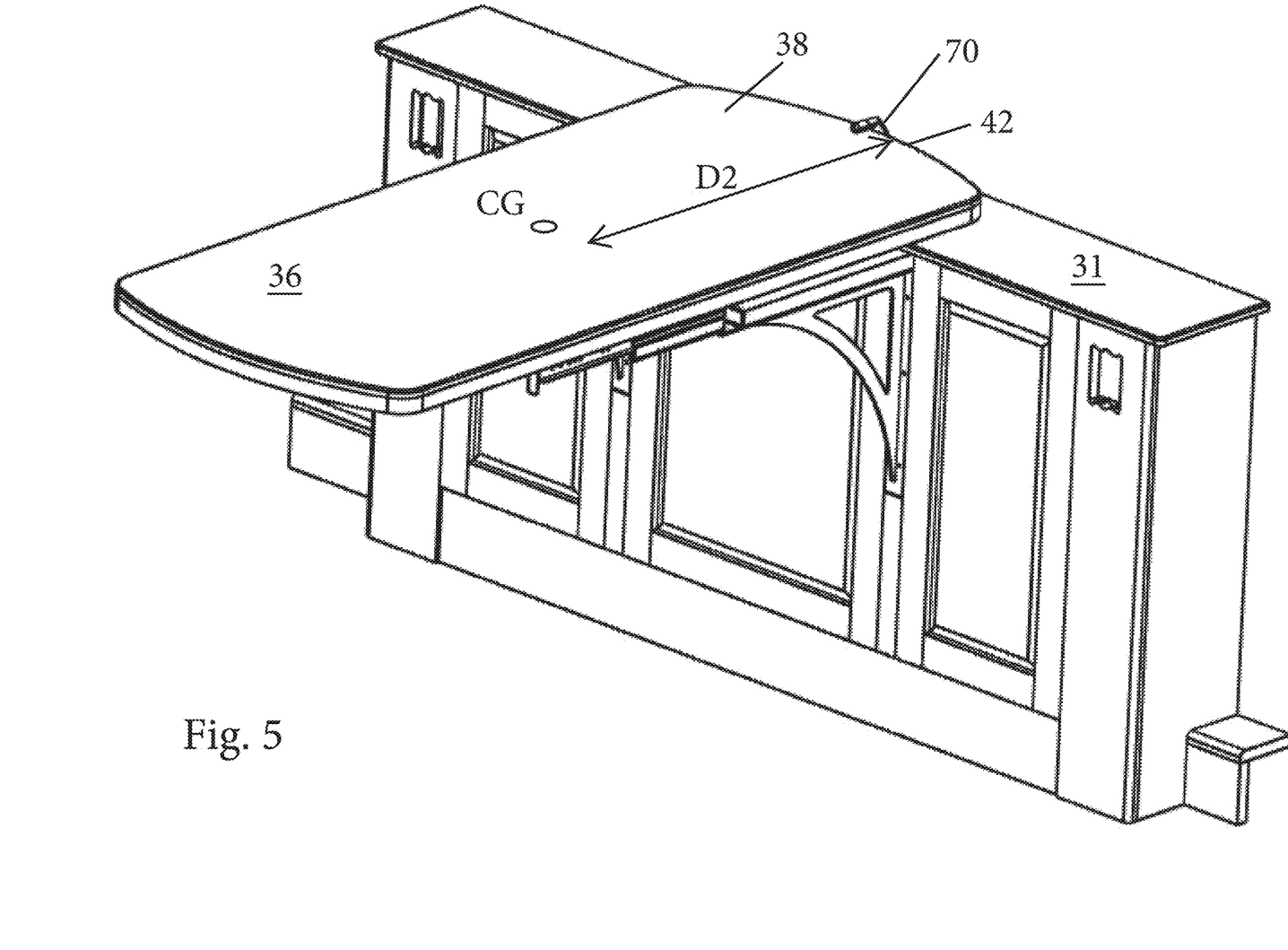
FIG. 5 is a perspective view of the table assembly of FIG. 1 in an extended position.

When moving the table member 36 from the stowed position (FIG. 2) to the extended position (FIG. 5), it is preferred that the table member 36 first be slid away from the wall 30 (FIG. 4) and then be rotated to the extended position (FIG. 5).

To facilitate movement of the table member 36 between the stowed and extended positions, the illustrated table assembly 32 further includes a transfer mechanism 50 coupling the table member 36 to the wall 30. The illustrated transfer mechanism 50 includes a telescoping slide mechanism 52 and a rotation mechanism 54 supported by the telescoping slide mechanism 52. In the illustrated embodiment, the telescoping slide mechanism 52 includes two telescoping slides 56 (e.g., 16" drawer slides with push/pull, in/out, latch release finger tabs on front edge of drawer slides and a 500 lb rating per side), each having one end secured to one of the brackets 34 and the other end secured to a bottom surface of a slide table 58 to facilitate translating the slide table 58 away from the wall. The illustrated rotation mechanism 54 includes a pivot table 60 (e.g., a turntable with 360 degree rotational capability and pressure spring detents every 90 degrees) supported by the slide table 58 and secured to the table member 36 to facilitate rotation of the table member 36 relative to the slide table 58. The size and capacity of the slide mechanism and turntable will depend on the size and weight of the table member 36. Suitable slide mechanisms and turntables can be sourced from McMaster-Carr Supply Company of Elmhurst, Illinois.

Figure 6:
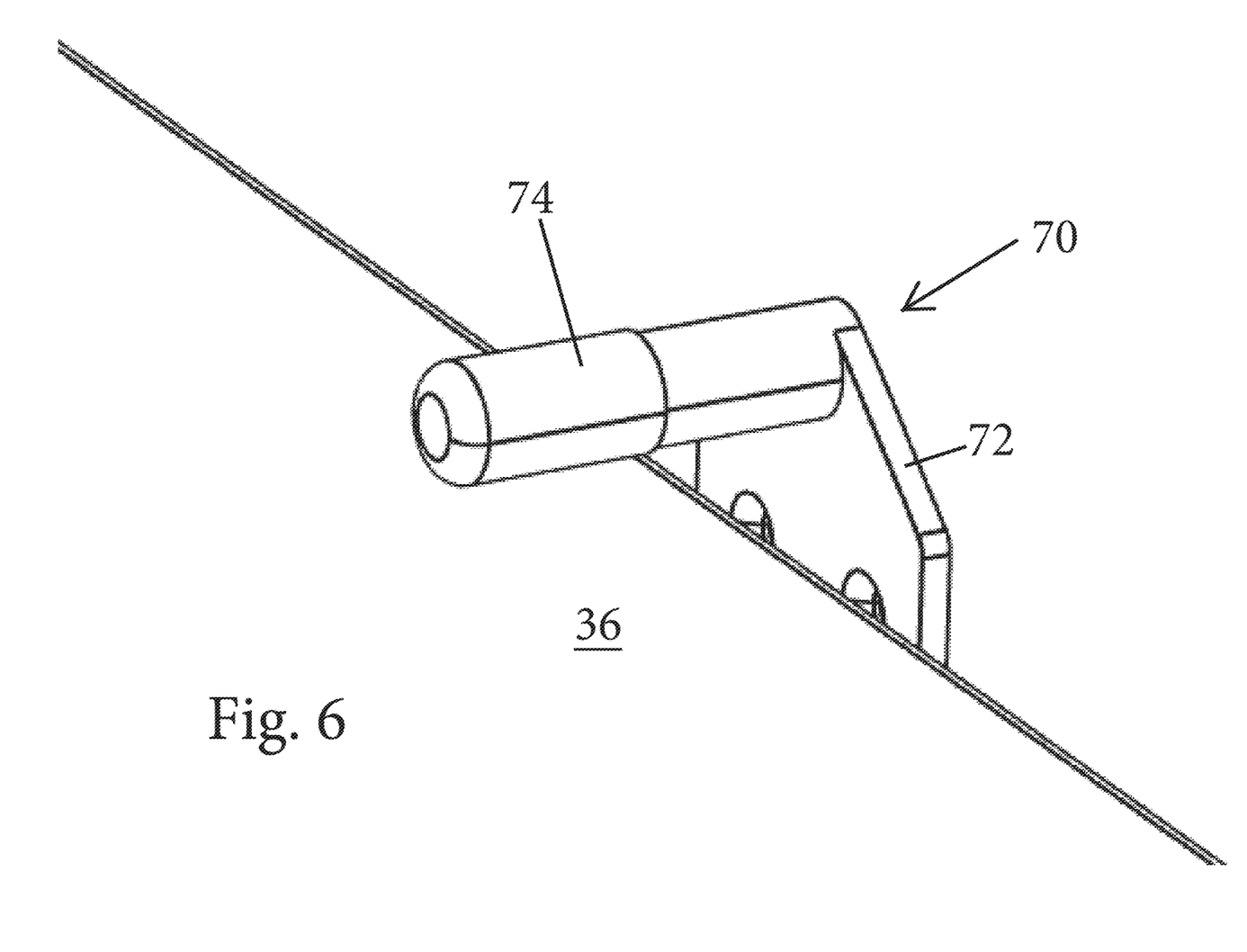
FIG. 6 is an enlarged perspective view of an upper support.
Figure 7:
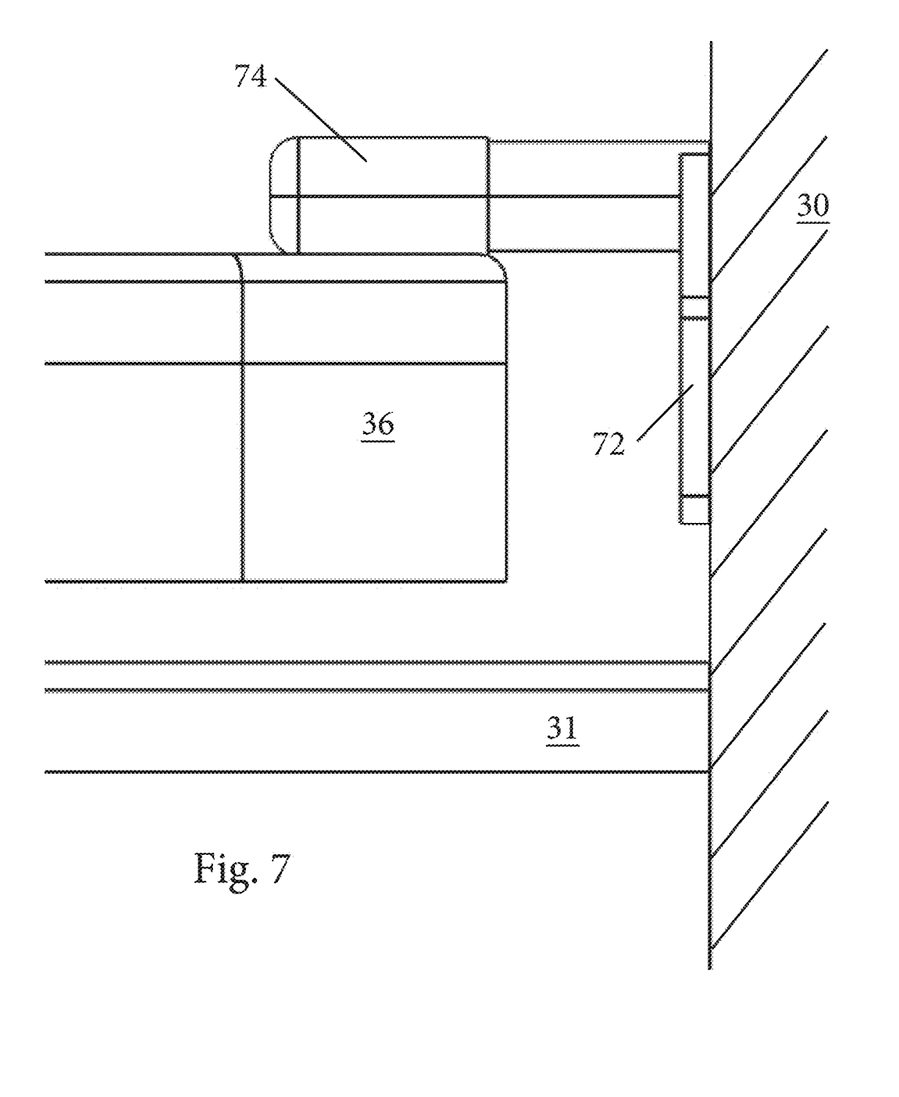
FIG. 7 is a side view of the upper support positioned above the table member in the extended position.

Referring to FIG. 6, an upper stay member 70 is secured to the wall 30 to limit upward movement of an edge of the table member 36. More specifically, the upper stay member 70 includes a base 72 secured to the wall 30 and a cap member 74 positioned above an edge of the table member 36. Preferably, the portion of the cap member 74 that contacts the upper surface of the table member 36 is an anti-scratch material, such as a polyethylene plastic. The cap member 74 may also be rotatable relative to the base 72 to further inhibit scratching of the table member 36. The upper stay member 70 limits upward movement of the table member 36 (e.g., if the opposite edge of the table member 36 receives a downward force) and also helps to guide the table member 36 when being moved between the stowed and extended positions.

Various features of the disclosure are set forth in the following claims.

The invention claimed is:

1. A recreational vehicle comprising:
   wheels adapted to roll along a ground surface;
   a chassis supported on the wheels;
   a wall supported by the chassis; and
   a table assembly supported by the chassis, the table assembly including
      a table member having a supporting surface, a side edge, and an end edge, and
      a transfer mechanism having a slide mechanism for translating the table member toward and away from the wall and a rotation mechanism for rotating the table member relative to the wall,
   wherein the table member is moveable between a stowed position in which the side edge is adjacent the wall and the supporting surface defines a first plane, an intermediate position in which the supporting surface is in the first plane, and an extended position in which the end edge is adjacent the wall and the supporting surface defines a second plane that is co-planar to the first plane,
   wherein the intermediate position is translationally displaced from the stowed position via the slide mechanism, while the extended position is rotationally displaced from both the stowed position and the intermediate position via the rotation mechanism.

2. The recreational vehicle of claim 1, wherein the wall is on an inside of the vehicle and the table assembly is supported by the wall.

3. The recreational vehicle of claim 2, further comprising a first bracket and a second bracket, both of which are coupled to the wall and support the table member.

4. The recreational vehicle of claim 3, wherein the slide mechanism includes a first telescoping slide coupled to the first bracket and a second telescoping slide coupled to the second bracket, wherein the first telescoping slide and second telescoping slide are each coupled to the table member, thereby allowing the table member to translate toward and away from to the wall.

5. The recreational vehicle of claim 1, wherein the rotation mechanism includes a pivot table coupled to the table member that has pressure spring detents, thereby allowing the table member to be positioned in one of a plurality of predefined positions.

6. The recreational vehicle of claim 5, wherein the pressure spring detents are spaced apart at 90-degree angular increments.

7. The recreational vehicle of claim 1, wherein when the side edge is adjacent the wall, the side edge is parallel to the wall.

8. The recreational vehicle of claim 7, wherein when the end edge is adjacent the wall, the end edge is parallel to the wall.

9. The recreational vehicle of claim 1, wherein the table member has a center of gravity, and wherein the center of gravity is at a first distance from the wall in the stowed position, and the center of gravity is at the second distance from the wall in the extended position, the second distance being greater than the first distance.

10. The recreational vehicle of claim 9, wherein the center of gravity translates along an axis that is oriented perpendicular to the wall when the table member moves from the stowed position to the extended position.

11. The recreational vehicle of claim 1, wherein the table member is slid away from the stowed position and then rotated to the extended position.

12. The recreational vehicle of claim 1, wherein the table member moves in a horizontal plane defined by the first plane and the second plane when moving between the stowed position and the extended position.

13. A recreational vehicle comprising:
   wheels adapted to roll along a ground surface;
   a chassis supported on the wheels;
   a wall supported by the chassis; and
   a table assembly supported by the chassis, the table assembly including a table member having a supporting surface, a side edge, and an end edge,
      wherein the table member pivots between a stowed position in which the side edge is parallel and adjacent to the wall and the supporting surface defines a first plane, an intermediate position in which the side edge is spaced apart from the wall and the supporting surface is in the first plane, and an extended position in which the side edge is perpendicular to the wall and the supporting surface defines a second plane that is co-planar to the first plane,
      wherein the table member is translatable relative to the wall, and
      wherein the end edge is parallel and adjacent the wall when the table member is in the second extended position.

14. The recreational vehicle of claim 13, wherein the table assembly further includes a transfer mechanism having a slide mechanism for translating the table member relative to the wall and a rotation mechanism for rotating the table member relative to the wall.

15. The recreational vehicle of claim 13, wherein the table member is slid away from the stowed position and then rotated to the extended position.

16. The recreational vehicle of claim 13, wherein the table member has a center of gravity that is spaced a first distance from the wall when the table is in the stowed position, and the center of gravity is spaced a second distance from the wall when the table is in the extended position, wherein the second distance is greater than the first distance.

17. The recreational vehicle of claim 16, wherein the center of gravity translates along an axis that is oriented perpendicular to the wall when the table member moves from the stowed position to the extended position.

18. The recreational vehicle of claim 13, wherein the table member allows walk-through clearance about the recreational vehicle when in the stowed position and provides seating for at least four people in the extended position when the vehicle is parked.

19. The recreational vehicle of claim 13, wherein the side edge is a first edge and the end edge is a second edge, wherein the first edge is longer than the second edge, such that the table member extends farther away from the wall when the table member is in the extended position.

* * * * *